United States Patent [19]

Chiang

[11] Patent Number: 5,052,287
[45] Date of Patent: Oct. 1, 1991

[54] COOKING APPARATUS FOR OIL FRYING

[76] Inventor: Chao-Kun Chiang, No. 7,5 Alley, 129 Lane, Sec.3, Wen Hsin Rd., Taichung, Taiwan

[21] Appl. No.: 611,517

[22] Filed: Nov. 13, 1990

[51] Int. Cl.⁵ .................................... A47J 37/12
[52] U.S. Cl. ............................ 99/404; 99/407; 99/409; 134/159
[58] Field of Search .............. 99/403, 404, 407, 409, 99/410, 416, 326, 330, 331, 355, 356, 360, 443 C; 426/438, 509, 523; 126/391; 134/79, 80, 134, 159

[56] References Cited

U.S. PATENT DOCUMENTS

| 757,186 | 4/1904 | Fancher | 99/404 |
|---|---|---|---|
| 940,557 | 11/1909 | Roe | 99/409 |
| 3,474,726 | 10/1969 | Curtin | 99/404 |
| 3,585,923 | 6/1971 | Waller | 99/356 |
| 3,614,924 | 10/1971 | Hickey | 99/404 |
| 3,761,290 | 9/1973 | Brunner | 99/330 |
| 3,793,937 | 2/1974 | Lipoma | 99/355 |
| 4,001,451 | 1/1977 | Veeneman et al. | 426/438 |
| 4,228,730 | 10/1980 | Schindler et al. | 126/391 |
| 4,478,140 | 10/1984 | Bullock | 99/330 |
| 4,873,920 | 10/1989 | Yang | 99/416 |

FOREIGN PATENT DOCUMENTS

| 1311698 | 5/1987 | U.S.S.R. | 99/404 |
|---|---|---|---|
| 895571 | 5/1962 | United Kingdom | 99/404 |

Primary Examiner—Timothy F. Simone
Attorney, Agent, or Firm—Bacon & Thomas

[57] ABSTRACT

A cooking apparatus for oil frying comprising an outer pan, a rotational wheel and a plurality of pivotal dummy plates wherein the wheel is mounted on a pivot axis between two shaft brackets of the outer pan, the dummy plates are mounted on the circumference of the wheel, and the pivot axis of each dummy plate is parallel with the pivot axis of the wheel. Food can be filled for deep-fried cooking through an end of the outer pan and is pushed forward by the dummy plates on the wheel and forcibly pushed out of another end of the outer pan.

1 Claim, 2 Drawing Sheets

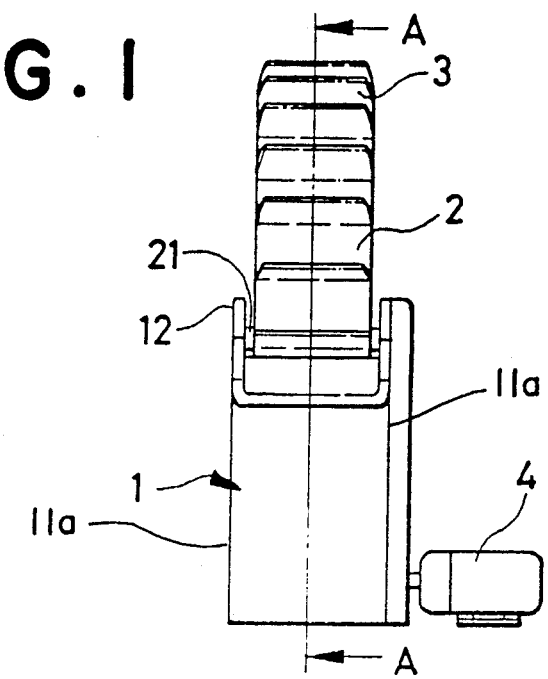
FIG. I
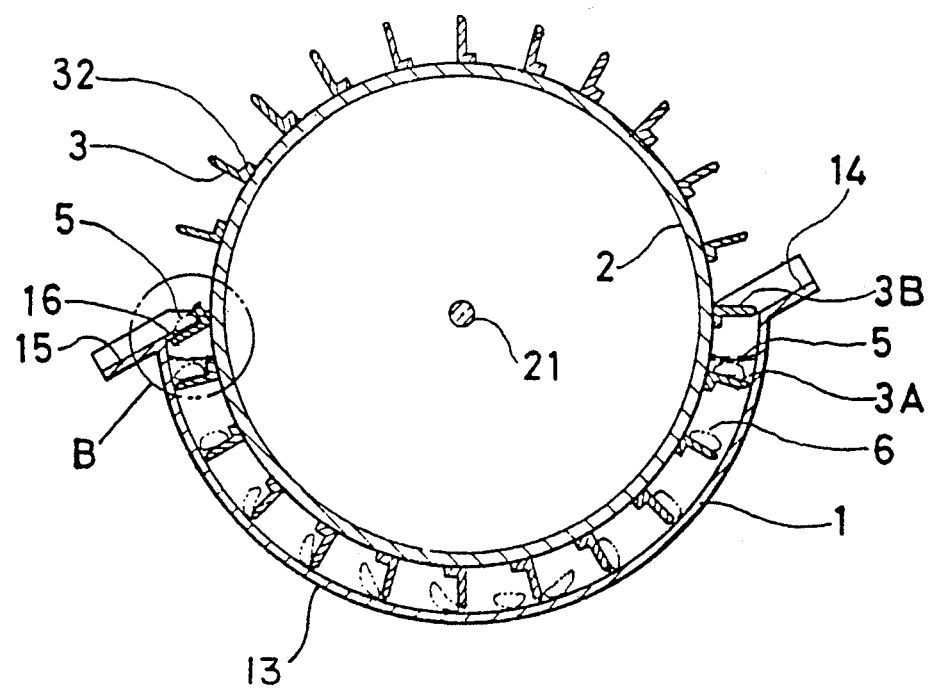
FIG. 2

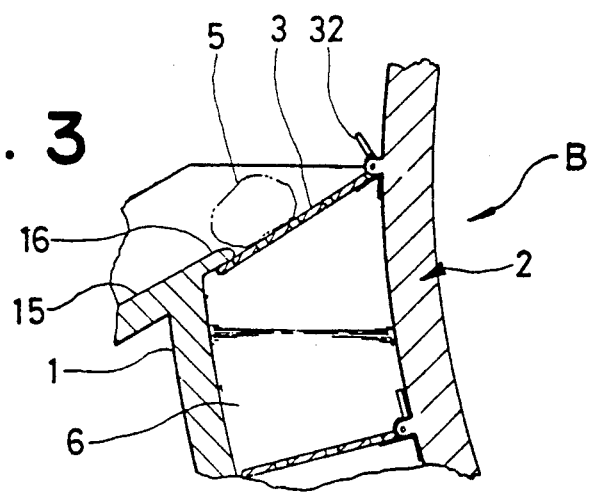
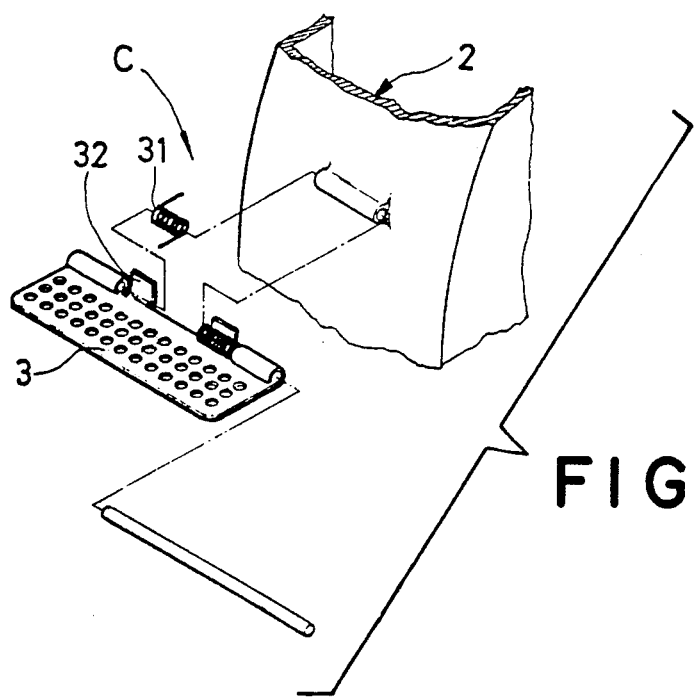
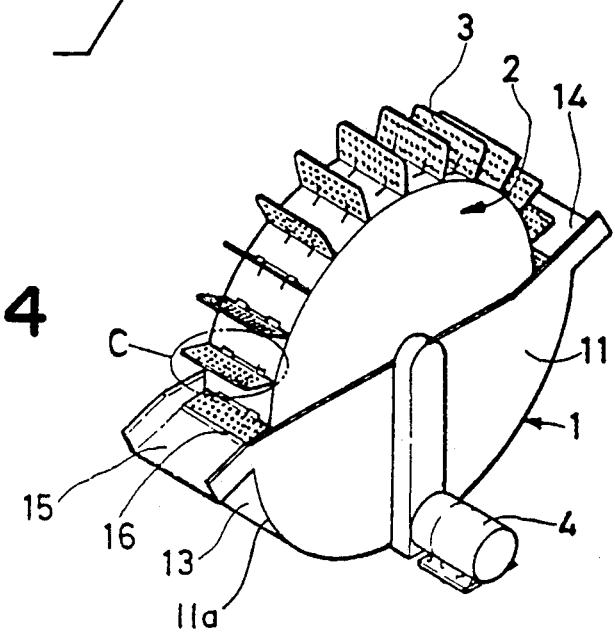

COOKING APPARATUS FOR OIL FRYING

BACKGROUND OF THE INVENTION

The conventional oil-fried cooking often uses a manual type apparatus. A pan with a round bottom is used for loading and heating oil, and then food together with spices are put into the pan for frying and removing manually. How many times that oil-fried food is turned over and how long the food is fried entirely depends on the experience and skill of the cook. Hence, it is difficult to control the quality of oil-fried food. In addition, oil-fried food together with spices must be filled, turned over and removed manually each time so that the cooker is too busy to maintain quality control when a large quantity of food is being oil fried simultaneously. Besides, a cook's skills and working speed are limited so that it is difficult to make a great quantity of oil-fried food in exactly the same quality.

SUMMARY OF THE INVENTION

This invention relates to a cooking apparatus for oil frying having a wheel being driven by an external power input for rotation within an outer pan at a predetermined speed. Dummy plates on the rotational wheel are provided to push and separate various kinds of oil-fried food so as to promote both quality and quantity of the fried food.

BRIEF DESCRIPTION OF THE DRAWINGS

FIG. 1 is a side view of this invention.

FIG. 2 is a cutaway perspective view taken on line of FIG. 1.

FIG. 3 is an enlarged detailed view taken on part B of FIG. 2.

FIG. 4 is an elevational view of this invention.

FIG. 5 is an enlarged detailed view taken on part C of FIG. 4.

DETAILED DESCRIPTION OF THE PREFERRED EMBODIMENT

This invention provides cooking apparatus for oil frying comprising an outer pan 1, a rotational wheel 2 and a plurality of dummy plates 3; said outer pan 1 is an oil container resembling a semi-round shape and is permitted to be heated. Said outer pan 1 consists of two parallel semi-round plates 11. A shaft bracket 12 is mounted at the circular center of each semi-round plate 11 and an arc plate 13 is connected between the arc edges 11a of said two semi-round plates 11. One end of said arc plate 13 extends downwards and obliquely into the inlet port 14 of the outer pan 1 and the other end extends downwards and obliquely to the outlet port 15. Said outlet port 15 has an inwardly projecting portion 16 that can force the dummy plates 3 to deflect backwards at a predetermined angle. As shown in FIG. 2, said rotational wheel 2 is a hollow and close wheel body and at the center of said rotational wheel a support shaft 21 is pivotally mounted on the shaft bracket 12 of the outer pan 1. Said shaft 21 is geared by the motor 4 to rotate at a predetermined speed. When said rotational wheel 2 uses the support shaft 21 to mount on the shaft bracket 12 it will occupy most of the loading space in the outer pan 1. The plurality of dummy plates 3 are equally spaced and pivotally mounted on the circumference of the rotational wheel 2, and are each respectively pushed forward by an elastic element 31. The pivot axis of each said dummy plate 3 and center shaft line of the rotational wheel 2 are in parallel. A check bending plate 32 is provided in front of the pivot axis of each dummy plate 3 to limit the pivotal deflection of each dummy plate 3 within a predetermined angle.

Referring to FIG. 2, food 5 for oil-fried cooking can be slid through the inlet port 14 of the outer pan 1 onto the first dummy plate 3A. Due to the rotational wheel 2 in rotating according to a proper speed, food 5 for oil-fried cooking on the first dummy plate 3A is pushed under the surface of oil 6 to enable said food 5 to be disposed between the first dummy plate 3A and the second dummy plate 3B. Though oil 6 is permitted to enter between said two dummy plates 3A and 3B, food 5 is confined therebetween. Hence, food 5 will be heated and deeply fried, while traveling an arc route. Finally, oil-fried food 5 located between the first and second dummy plates 3A and 3B exits from the surface of oil 6 and naturally drops onto the second dummy plate 3B. As the projecting portion 16 of the inlet port 15 of the outer pan 1 blocks the outer end of the second dummy plate 3 B said second dummy plate 3B swings downwards so that oil-fried food 5 slides downwards along the second dummy plate 3B out the outlet port 15 of the outer pan 1 at the end of the oil-fried cooking procedure.

For the use of this invention, food 5 for oil-fried cooking is forcibly pushed forward under the surface of oil 6. As the oil-fried food 5 is pushed forward along a semi-arc route and turns over. Further because oil-fried food 5 is submerged in the oil 6, all surfaces of food 5 will be heated uniformely in full due to food 5 being turned over so that cooking time can be greatly reduced.

Furthermore, the time for heating oil-fried food 5 can be controlled by the rotational speed of motor 4 so that the operator may easily control the quality of oil-fried food 5 to produce a large quantity of oil-fried food having uniform quality.

In addition to being made as a hollow and closed wheel body, as the above-mentioned example, the rotational wheel 2 can also be made with a plurality of venting holes to form a net-type metal structure. However, a hollow and closed type wheel serves to economize oil consumption.

I claim:

1. An oil-fried cooking apparatus comprising:

an outer pan being an oil container resembling a semi-round shape and being permitted for heating; said outer pan including an inlet port, an outlet port and two parallel semi-round plates; a shaft bracket being provided at the center of each semi-round plate, and an arc edge of each of said two semi-round plates being connected by an arc plate; an end of said arc plate being provided for oil-fried food sliding bias downwards into the inlet port of the outer pan and the outer end of said arc plate being bias downward to enable food to be pushed out of the outlet port, and the outlet port having an inward projecting portion;

a hollow wheel body, and a support shaft pivoted on the shaft bracket of the outer pan being provided at a circular center of the wheel, and said wheel being rotatable within the outer pan by a support shaft geared by a motor; and a plurality of dummy plates pivotally mounted on the circumference of the wheel between the arc plates of the outer pan, the pivot axis of each dummy plate and axis of rotation of the wheel being in parallel, and each said dummy plate being urged forward by an elastic element, and a check bending plate being provided in front of the pivot axis of each dummy plate.

* * * * *